United States Patent [19]
Hickerson

[11] Patent Number: 5,370,182
[45] Date of Patent: Dec. 6, 1994

[54] THERMAL EXTRACTION SYSTEM AND METHOD

[76] Inventor: Russell D. Hickerson, 1105 Essex, Odessa, Tex. 79760

[21] Appl. No.: 158,867

[22] Filed: Nov. 29, 1993

[51] Int. Cl.⁵ .............................................. E21B 43/00
[52] U.S. Cl. .................................... 166/272; 166/369
[58] Field of Search ............... 166/268, 269, 272, 302, 166/303, 306, 369, 57–59

[56] References Cited

U.S. PATENT DOCUMENTS

| | | | |
|---|---|---|---|
| 4,418,752 | 12/1983 | Boyer et al. | 166/267 |
| 4,456,068 | 6/1984 | Burrill, Jr. et al. | 166/272 X |
| 4,460,044 | 7/1984 | Porter | 166/272 X |
| 5,005,644 | 4/1991 | Wall et al. | 166/272 |
| 5,145,003 | 9/1992 | Duerksen | 166/272 |

*Primary Examiner*—Michael Powell Buiz
*Attorney, Agent, or Firm*—Milburn & Peterson

[57] ABSTRACT

The Thermal Extraction System and Method utilizes a geothermal heat source to provide thermal energy at the surface by drilling a bore hole into the geothermal heat source and equipping the bore hole with a casing and multiple tubing strings. A cavern is formed in the geothermal heat source, such as a brine cavern. One of the tubing strings is a production tubing string used to produce hot brine at the surface and has a low thermal conductivity fluid surrounding the production tubing string which may be adjusted to maintain an interface with brine from the cavern at varying levels around the production tubing string and thereby provides temperature regulation of the brine. This invention contemplates the production of brine at the surface which may be used in heat transfer applications or processed as feed stock for salt production with unsaturated brine returned to the brine cavern where it becomes saturated. The system and method may be used with an immiscible heat exchange fluid provided to absorb heat in the cavern from the mineral deposit and circulated to the surface through a heat exchanger and returned to the cavern.

20 Claims, 4 Drawing Sheets

THERMAL EXTRACTION SYSTEM AND METHOD

BACKGROUND OF THE INVENTION

This invention relates to an improved thermal extraction system and method for underground heat sources and in particularly to thermal extraction from solid masses of crystal or rock salt or similar minerals.

It is known that highly heat conductive minerals such as rock salt and quartzite and the like sometimes occur in geological forms, such are known as spines or spires or domes or veins, and comprise relatively solid masses extended upward towards the earth's surface. These rock salt or mineral domes are within reach of modern drilling equipment.

The occurrence of this salt dome phenomena is fully described in U.S. Pat. Nos. 3,676,078 (Jacoby I) and 3,864,917 (Jacoby II) of Charles H. Jacoby and assigned to International Salt Company. In the background discussion, Jacoby I states that the expense and difficulties in attempting bore hole operations through ordinarily encountered geological structures to reach such depths as would encounter rock formations competent to support a constant and sufficiently high temperature heat extraction operation have proved prohibitive, and cites examples of such prior proposals in U.S. Pat. Nos. 2,461,449; 3,140,986; 3,274,769; and 3,363,664.

Jacoby I describes a method of solution mining and recrystalization recovery of solid sodium chloride from underground formations which utilize the heat conductivity of underground salt spires or domes or the like. Jacoby I penetrates a salt dome with a well and by utilizing water dissolves sufficient salt in the salt dome to form a cavern from which the brine is withdrawn. A second well is drilled for the purpose of solution mining salt. The first well is used as a heat source to heat a heat exchange fluid, such as any inert (to salt) gas or liquid. The heat exchange fluid is circulated from the heat reservoir through the evaporator and back to the heat reservoir which provide a source of heat for the evaporator. Brine from the solution mining well is pumped into the evaporator where the brine solution is vaporized in the evaporator with the salt being precipitated. The water vapor is condensed and returned to the salt cavern for further extraction of salt.

Jacoby I has several drawbacks, first at the depths where the relatively high temperatures exist, the rock salt will behave plastically. Unless a counter pressure is maintained in the cavern, the normal pressure, due to the weight of the salt and its overburden, is sufficient to cause the plastic salt to flow and thereby close the cavern (see U.S. Pat. No. 4,052,857, discussed later herein). Jacoby I also, requires mining, for each salt dome cavern in operation as a heat reservoir, of relatively large amounts of salt.

Jacoby II discloses a geothermal energy system, wherein a rock salt deposit or dome is penetrated by a bore hole to a suitable depth and the deposit is solution mined of the salt to provide a cavern of prescribed shape and dimension in the salt mass as a heat reservoir for the system. The heat reservoir is emptied of the salt solution and flushed with heat exchange fluid.

The heat reservoir of Jacoby II must be maintained as a highly controlled volume heat reservoir and the flow rate of the heat exchange fluid must be closely monitored to maintain a desired temperature. A pump is utilized to maintain the flow of the heat exchange fluid through the heat reservoir and the flow rate and/or temperatures are monitored to maintain the desired temperature.

Further, Jacoby II discloses a self moving heat exchange system with the hot heat exchange fluid withdrawn near the top of the cavern and the relatively cold fluid returned near the bottom of the cavern. Because the return fluid is cold having its heat extracted in a heat exchanger it is heavier than the relatively hotter heat exchange fluid. The cold heat exchange fluid being returned near the bottom of the cavern will cause the hotter fluid near the top of the cavern to rise and flow up the tubing and through the surface heat exchange device where its heat is extracted and then is returned as relatively cold fluid to the bottom of the cavern. Jacoby II restricts the heat exchange fluid as inert to the heat reservoir, since it must maintain the precise volume to control the temperature of the heat exchange fluid. The same plasticity problem encountered by Jacoby I is also present in Jacoby II.

Another Patent, U.S. Pat. No. 3,348,883, of Charles H. Jacoby, assigned to International Salt Company (Jacoby III), describes a method of mining and beneficiation of salt from a salt dome in which he discusses conveying the brine from a brine cavern in a salt dome in heat-insulated form upwardly to the point of discharge of the brine into an evaporator. Jacoby III suggests a suitable arrangement for insulating the brine upflow, is by covering the production tubing with heat insulating material or enclosing the production tubing within a larger conduit and suggest filling this conduit with dead air or vacuum. Of course, the conduit must be sealed to the brine production tubing to avoid contact with the brine in the brine cavern. Such arrangements are subject to various casualties such as leakage of seals for the dead air or vacuum, as well as, saturation of the insulating material with brine.

In another context a heat pump using a deep well for a heat source is disclosed in U.S. Pat. No. 2,461,449 of Marvin Smith, assignor to Muncie Gear Works, Inc. Smith describes the use of a conduit around a production tubing from the deep well to provide a surrounding airspace throughout its length. This casing is closed at each end and is secured to the production conduit by welding or another suitable manner. This arrangement suffers the same casualties as Jacoby III.

U.S. Pat. No. 4,052,857, assigned to Dow Chemical Company (Dow) describes a geothermal energy extraction process utilizing a tubing or pipe closed at one end and preferably pointed, weighted with removable weights, and sunk into the salt dome at a depth where the salt exhibits plasticity. Once the first pipe is installed and the weights removed a second open-ended, insulated pipe is inserted into the first pipe to provide a double heat exchanger. In this operation thermal energy is extracted from the salt by passing a heat exchange fluid either down the second pipe and up through the annulus between the first and second pipe or vice versa. Dow encounters limitation in sinking the closed tubing in the plastic salt because to overcome the salt density Dow uses uranium dioxide to obtain sufficient weight to overcome this high density. Dow process is further limited due to overburden between the top of the salt dome and the surface of the earth which dissipate heat from the well. Special note is made in the Dow Patent that the thermal conductivity of the overburden to that of the rock salt is inversely related to the insulating properties of the overburden, and suggests that an anhydrite caprock above a salt dome possesses the best insulating property.

U.S. Pat. No. 4,512,156 of Nagase discloses an apparatus and method for using terrestrial heat to increase the temperature of a liquid which comprises a pipe buried in the earth in the region of high subterranean heat with a second pipe telescoped therein. The first pipe has a digging head on it's lower end and the second pipe is open at its lower end to communicate with the first pipe. The pipes are insulated with thermal insulation material on the outer surface of the inner and outer pipes. Water or other heat exchange fluid is pumped down the annulus between the pipes and withdrawn through the inner pipe for transfer to surface heat exchangers for use as a source of heat energy.

U.S. Pat. No. 3,862,545 of Ellis discloses a process for using energy from a hot brine well to operate a steam turbine for electric power generation. Ellis utilizes brine from a geothermal well as a source for recovering thermal energy by vaporizing the hot brine and using the steam generated to operate a turbine.

SUMMARY OF THE INVENTION

The present invention contemplates heat extraction from a salt dome by drilling a bore hole into the top of a salt dome and forming a brine cavern by solution mining or the like. The bore hole is equipped with a surface casing and three telescoping tubing strings, an inner string, outer string and a central string. Non-heat conducting centralizers are provided between the tubing strings and the casing to prevent contact between the various tubing strings and casing. The annulus between the outer surface casing and the outer tubing string is open to the salt cavern; and the annulus between the inner tubing string and the central tubing is open to the salt cavern. These two annuli are pressurized by surface compressor or source of compressed air or inert gas which provide insulation for the outer and inner strings of tubing. Immiscible heat exchange fluid is pumped down the inner tubing string which extends down near the bottom of the salt cavern and as the heat exchange fluid progresses towards the top of the cavern it absorbs heat and then is produced through the annulus between the outer tubing string and the central tubing string. The compressed air or inert gas may be maintained at different pressures to permit heat exchange fluid to enter the annuli and interface the air or inert gas insulator at varying levels which exposes the heat exchange fluid to the overburden temperature such that the temperature of the heat exchange fluid can be controlled by varying the pressure of the air or inert gas.

Neither Jacoby III, nor Smith disclose a system of regulating the temperature of the production stream of fluid, such as brine, by surrounding the brine production tubing with an insulating tubing forming an annulus with the production tubing in which the level of brine entering the annulus may be varied throughout it's length to increase or decrease the insulating jacket surrounding the production tubing which allows regulation of the temperature of the production stream of fluid. Thus, Jacoby III and Smith both lack the capability of regulating the temperature as disclosed by Applicant.

Dow describes the use of insulated pipe in a sealed heat exchanger which is designed to insulate the primary fluid rising through the insulated inner pipe. The overburden surrounding the Dow heat exchanger would impact the heat recovery. On the other hand Applicant utilizes a low thermal conductivity fluid as insulation between the overburden surrounding the casing of the bore hole and the outer most string of tubing as well as the annulus between the inner tubing string and the central tubing string. Additionally centralizers can be used to maintain spacing between the tubing strings and the casing.

Further, Applicant's invention avoids the problems associated with maintaining insulation exposure to brine or to the heat exchange fluid which may increase the conductivity of the insulation, and thus defeat its purpose. Moreover, Applicant's invention provides an adjustable arrangement where the temperature of the heat exchange fluid may be gradually increased by increasing the air or inert gas pressure in the annuli to lower the interface between the air and heat exchange fluid. Such temperature regulation is often required in startup operations such as large steam turbines or pumps.

In another arrangement of Applicant's invention a casing and two tubing strings telescoped inside the casing extend into the salt dome. The inner tubing string and the outer tubing string may have non-heat conducting centralizers to maintain separation therebetween. The outer tubing string which is open to the salt cavern is supplied with compressed air or inert gas, or other low thermal conductivity fluid, thus surrounding the inner tubing string with insulation. In this arrangement cool brine is pumped in the annulus between the casing and the outer tubing string and into the top of the salt cavern, while at the same time hot brine is pumped from the bottom of the salt cavern through the inner tubing string, thus providing a source of hot brine at the surface. The temperature of the cold and hot brine are adjusted by raising or lowering the interface between the brine and the compressed air or inert gas in the outer tubing string.

Instead of using telescoping tubing strings, two separate wells could be drilled in the salt dome and similarly insulated using compressed air or gas with the cool brine being pumped down one tubing string and the hot brine being pumped up the other tubing string. Insulation of the cold brine would be optional. Likewise, the temperature of the hot brine could be controlled by the compressed air insulation technique.

Alternatively, a bore hole could be drilled in the salt dome and equipped with a casing and two side by side tubing strings; one tubing string extending to the bottom of the casing and the other tubing string extending beyond the casing a substantial distance. A brine cavern would be formed by solution mining. In operation the casing is pressurized with a source of air or inert gas surrounding the side by side tubing strings and interfaced with the brine near the bottom of the casing. Hot brine is pumped to the surface through the tubing string at the top of the brine cavern for thermal recovery or salt production and the spent brine is reinjected through the tubing string extended near the bottom of the brine cavern. In this arrangement the side by side tubing strings are insulated from each other and the overburden.

In any of the three next foregoing arrangements, hot brine is provided at the surface and the temperature can be regulated through the raising or lowering of the interface between the brine in the salt cavern and the air or inert gas insulation. Hot brine could be used in numerous applications since it is supplied to the surface at a temperature hotter than most brine wells because of the insulation provided by air or inert gas or other low thermal conductivity fluid. Thus, the hot brine could be used as the feed stock in a salt manufacturing process, such as by the use of evaporators and the condensate from the evaporators could be returned to the brine cavern to produce more brine.

Also, hot brine at the surface could be used in a number of heat exchanger operations that are impervious to salt corrosion.

DETAILED DESCRIPTION OF THE INVENTION

Figure 1:
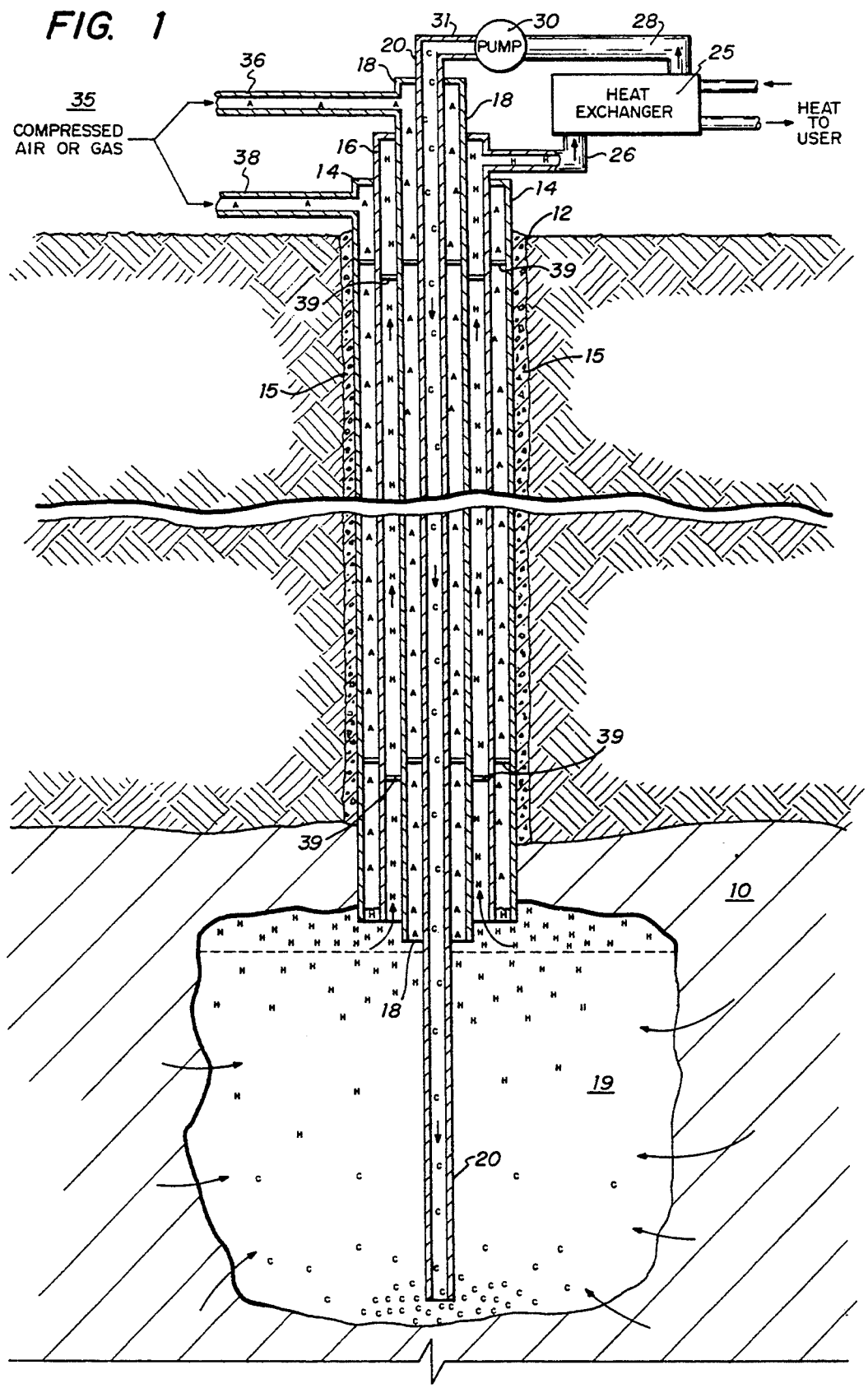
FIG. 1 illustrates a cross section view of a geological formation and bore hole therein with casing and tubing strings for thermal/extraction from a salt dome for use at the surface.

Referring now particularly to FIG. 1. A salt dome generally referred to as 10 is penetrated by bore hole 12. Bore hole 12 is equipped with casing 14, secured in bore hole 12 with cement 15, and tubing strings 16, 18, and 20. Each of the tubing strings 16, 18, 20, are equipped with non-heat conducting centralizers 39 to prevent the tubing strings and the casing from touching each other and thus lose insulation therebetween. Initially water may be injected through tubing string 16 to dissolve the salt in salt dome 10 and brine withdrawn through tubing string 18 to form brine cavern 19. Brine cavern 19 is enlarged to exceed the depth of tubing string 20. A sufficient quantity of brine is removed to permit circulation of an immiscible heat exchange fluid in sufficient quantity to absorb the heat from brine cavern 19 in salt dome 10. The produced brine may be disposed of or suitably used for other purposes. At the surface heat exchanger 25 is connected to tubing string 16 by pipe 26 and pipe 28 connects the heat exchanger to pump 30. Pump 30 is connected by pipe 31 to tubing string 20. A source of compressed air or inert gas 35 is connected to tubing string 18 by pipe 36 and casing 14 by pipe 38. Cool heat exchange fluid is injected through tubing string 20 (depicted by a series of the letter C) at the bottom of brine cavern 19. As the immiscible heat exchange fluid migrates towards the top of brine cavern 19, it absorbs heat, and this hot heat exchange fluid (depicted by a series of the letter H) is supplied to heat exchanger 25 through pipe 26 connected to tubing string 16. The return line 28 from heat exchanger 25 is connected to pump 30 and pump 30 is connected to tubing string 20 through line 31. The circulation of the cold heat exchange fluid through tubing string 20 to the bottom of brine cavern 19 moves the heat exchange fluid near the top of brine cavern 19, which has been heated to the temperature of brine cavern 19, through tubing string 16, back through pipe 26 to the input of heat exchanger 25.

In order to maintain the heat exchange fluid at a desired temperature casing 14 and tubing string 18, which are open to the top of brine cavern 19 are pressurized by source 35 of air or inert gas through pipes 36 and 38 such that the interface between the heat exchange fluid flowing into casing 14 and tubing string 18 are maintained at or near the bottom of casing 14 and tubing string 18 to provide maximum insulation and the highest temperature. The temperature of the heat exchange fluid reaching the surface may be controlled by decreasing the pressure to allow the heat exchange fluid interface to be further up in casing 14 and tubing string 18, thus the natural cooling effect of the overburden would reduce the temperature of the heat exchange fluid. Without the air or inert gas providing insulation the temperature of the heat exchange fluid reaching the surface would be low and the process would be uneconomical. It should be understood that brine alone could be used as the heat exchange fluid in applications where brine is suitable.

Figure 2:
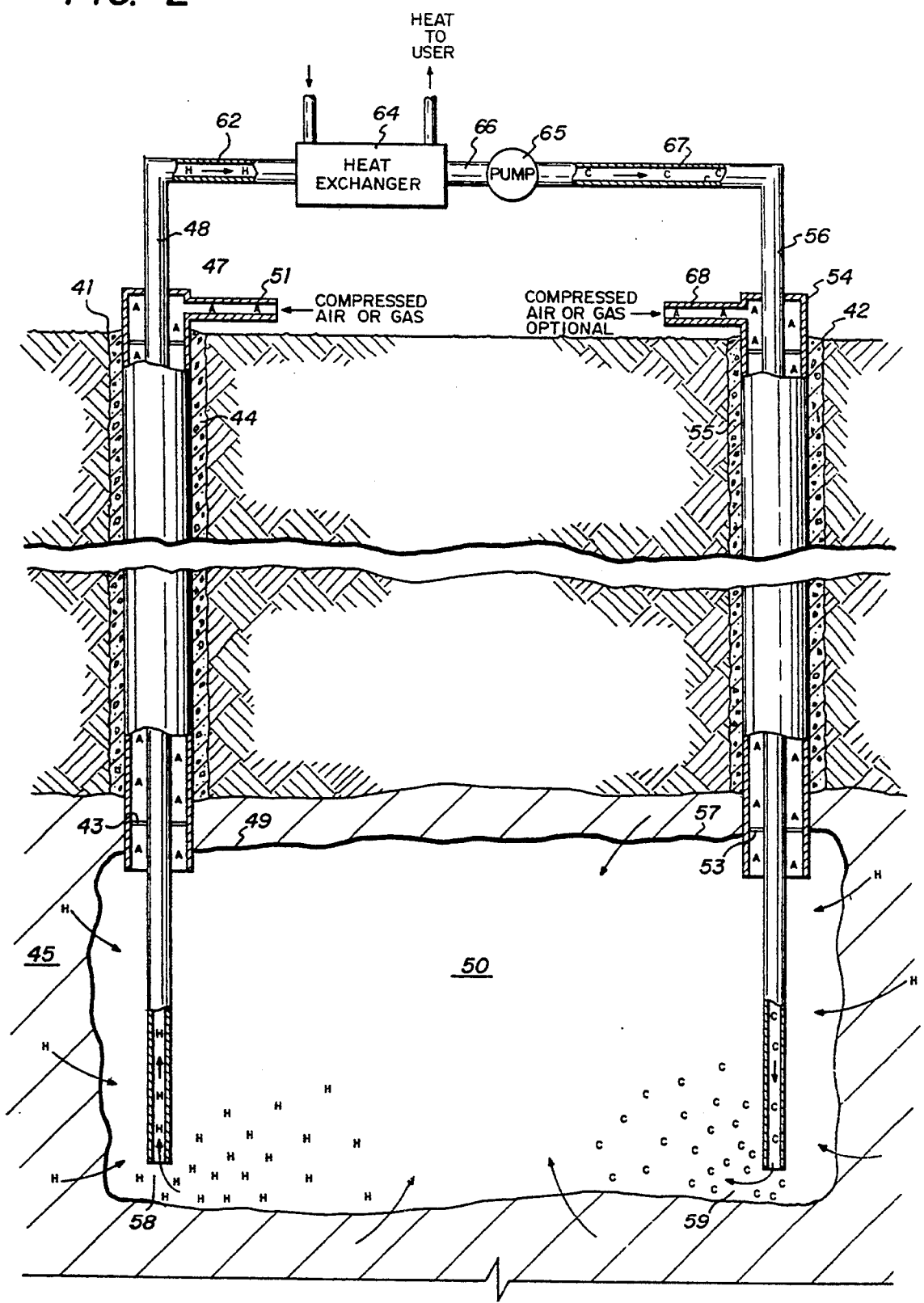
FIG. 2 illustrates a cross section view of a geological formation for the thermal extraction from a salt dome using two bore holes equipped with casing and tubing strings extending into a brine cavern of a salt dome in which one well is used for producing the hot brine and the one is used to reinject the cooler brine after thermal extraction.

The thermal extraction as depicted in FIG. 2 utilizes two bore holes 41 and 42, which penetrate salt dome 45 in spaced relationship. Bore hole 41 is equipped with casing 47 secured therein by cement 44 and tubing string 48. Non-heat conducting centralizers 43 prevent tubing string 48 from touching casing 47. Casing 47 penetrates the upper region 49 of brine cavern 50 and is supplied with source 51 of compressed air or inert gas. Tubing string 48 extends to lower region 58 of brine cavern 50. Bore hole 42 is equipped with casing 54 secured therein by cement 55 and tubing string 56. Non-heat conducting centralizers 53 prevent tubing string 56 from touching casing 54. Casing 54 penetrates lower region 58 of brine cavern 50 and tubing string 56 extends to lower region 59 of brine cavern 50. Optionally casing 54 is supplied with source 68 of compressed air or inert gas. Brine cavern 50 in salt dome 45 may be formed in salt dome 45 by injecting fresh water through casing 47 in bore hole 41 or casing 54 in bore hole 42, thus solution mining the salt. After brine cavern 50 is formed, then tubing string 48 is connected by pipe 62 to heat exchanger 64. Heat exchanger 64 is connected to pump 65 by pipe 66 and pump 65 is connected to tubing string 56 by pipe 67.

In operation, the two well system can operate either with brine or an immiscible heat exchanger fluid. In the case of brine, source 51 of compressed air or inert gas would be injected through casing 47 to form an interface with brine near the bottom of casing 47 in upper region 49 of brine cavern 50 and would thus provide insulation for tubing string 48. Pump 65 produces brine from region 58 of brine cavern 50 through tubing string 48. Since tubing string 48 is insulated by source 51, hot brine is provided through pipe 62, through heat exchanger 64 where the heat would be extracted for surface uses and the spent brine flows through pipe 66, pump 65 and pipe 67 to tubing string 56 where it is pumped to bottom region 59 of brine cavern 50. Source 68 of compressed air or inert gas may optionally be provided to casing 54 to insulate tubing string 56 from the surface down to salt dome 45. This arrangement would prevent the brine in tubing string 56 from cooling down to the overburden temperature.

Also, it should be understood that brine cavern 50 could be shaped to provide production of the hot brine from a higher level than the reinjection level of the cool brine, thus brine cavern 50 could be shaped similar to FIG. 2 of Jacoby II. Of course, the flow of cool brine through tubing string 56 in brine cavern 50 to tubing string 48 would provide sufficient dwell time for the brine to again reach the temperature of salt dome 45.

It will be understood that the thermal extraction system in FIG. 2 could employ immiscible heat exchange fluid by making brine cavern 50 such that upper region 49 was substantially above upper region 57 and tubing string 48 was raised to about the depth of casing 47.

Figure 3:
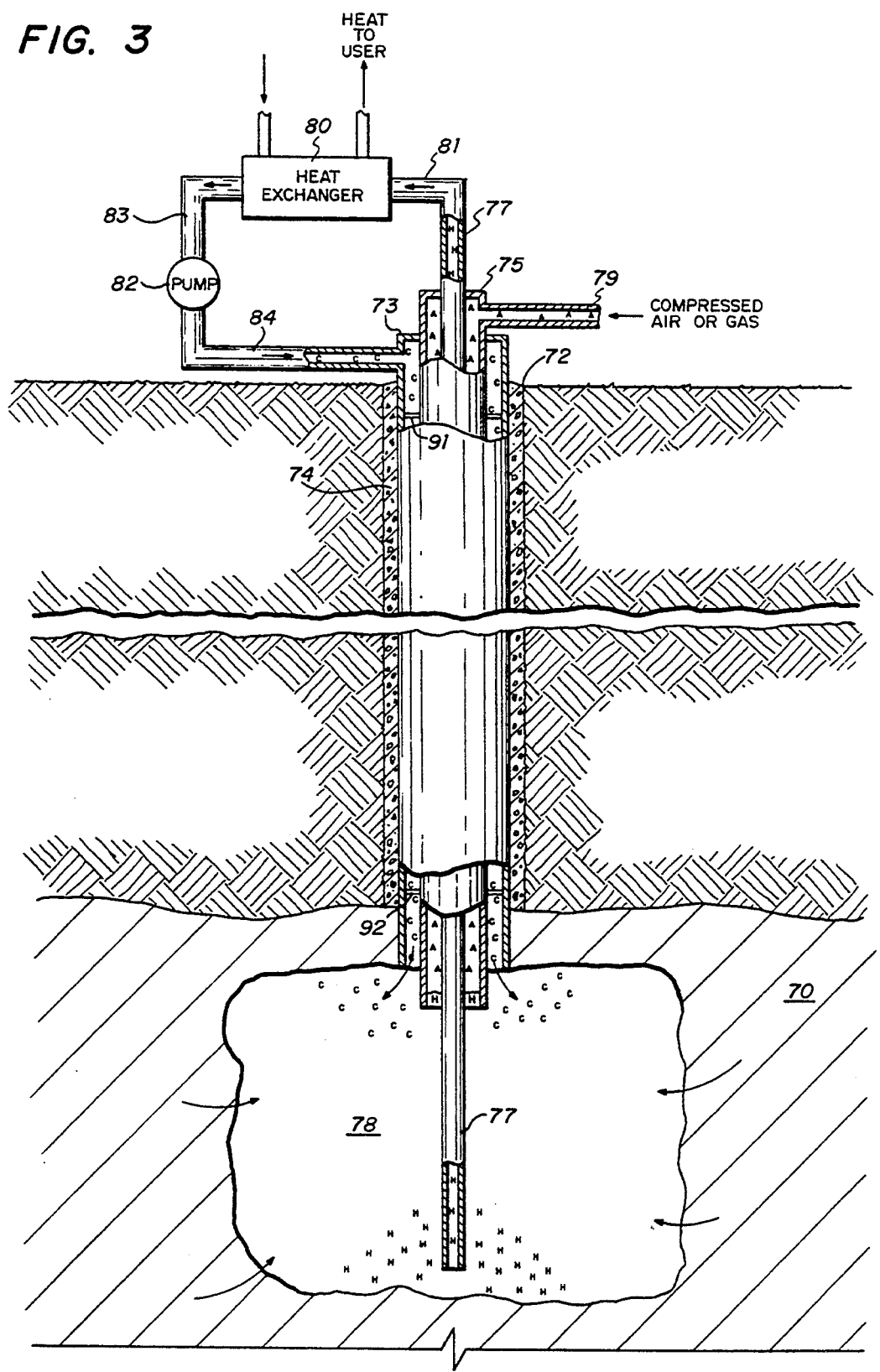
FIG. 3 illustrates a cross section view of a geological formation having a single bore hole therein, equipped with a casing and two tubing strings, wherein the hot brine is produced from the bottom of the brine cavern through the inner tubing string, while compressed air or gas pressurizes the outer tubing string to provide insulation from the cool brine being reinjected through the casing.

Referring now to FIG. 3, a salt dome 70 is penetrated by a bore hole 72. Bore hole 72 is equipped with casing 73 which is cemented into bore hole 72 with cement 74. Tubing String 75 is set in casing 73 and tubing string 77 is telescoped in tubing string 75. By solution mining or other known ways brine cavern 78 is formed in salt dome 70, such that brine cavern 78 extends beyond the bottom of casing 73 to below the bottom of tubing string 77. Tubing string 75 is provided with source 79 of compressed air or inert gas. Tubing string 77 is connected to heat exchanger 80 by pipe 81, heat exchanger 80 is connected to pump 82 by pipe 83, and pump 82 is connected to casing 73 by pipe 84.

In operation, pump 82 pumps the brine from the bottom of brine cavern 78 through tubing string 77, through heat exchanger 80 and returns the brine through casing 73 to the top of bring cavern 78. The annulus between tubing string 75 and tubing string 77 is pressurized with compressed air or inert gas from source 79 such that the brine interface is near the bottom of tubing string 75. The pressure from source 79 can be reduced such that brine from the top of brine cavern 78 would enter tubing string 75 and thus have a cooling effect on the brine being pumped through tubing string 77 to heat exchanger 80.

Figure 4:
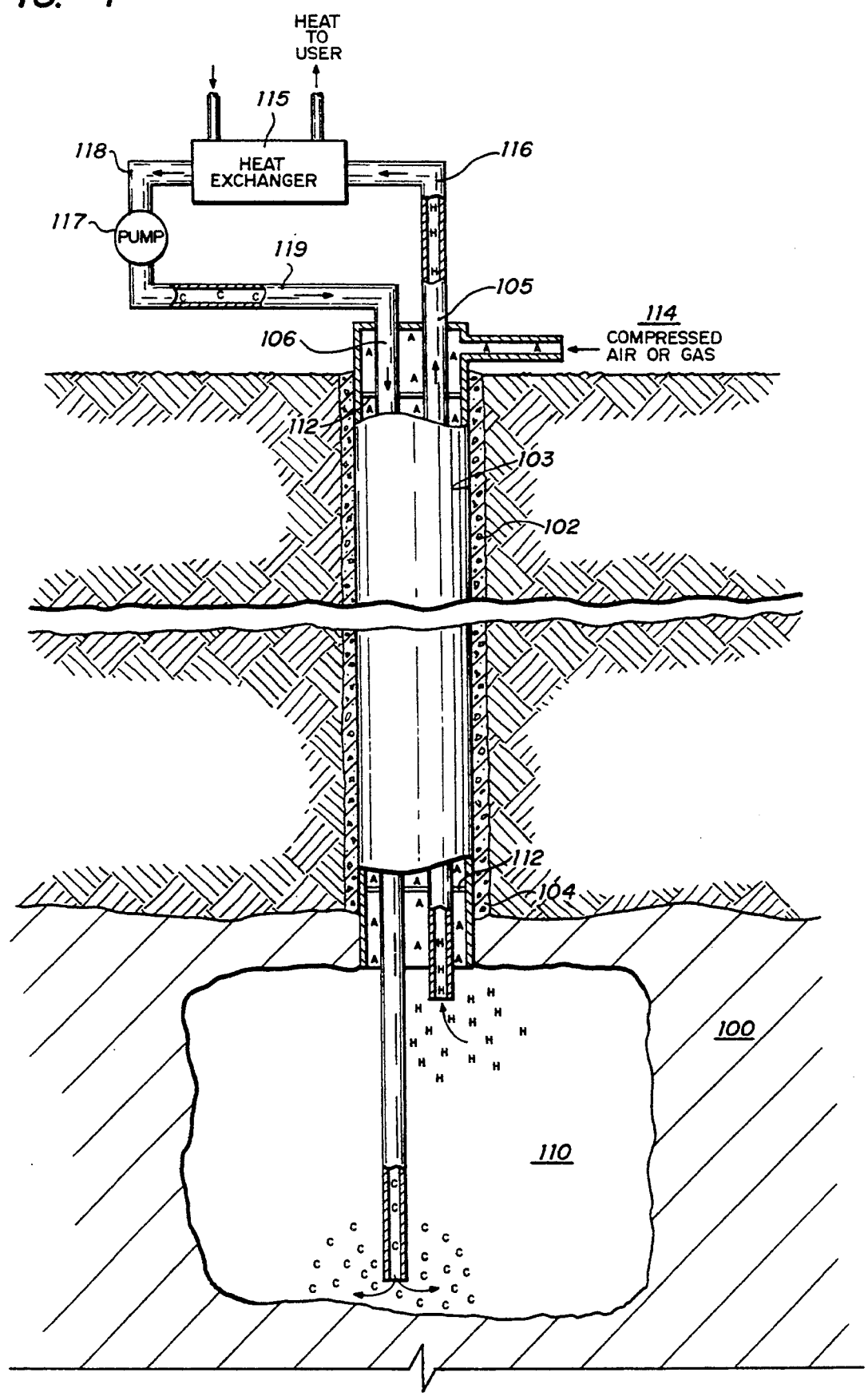
FIG. 4 illustrates a cross sectional view of a geological formation with a bore hole penetrating the brine cavern of a salt dome and equipped with a casing and a pair of tubing strings within said casing spaced apart wherein hot brine is produced from the bottom of the brine cavern through one of the pair of tubing strings and cool brine is returned through the other of the pair of tubing strings, while compressed air or gas pressurizes the casing to provide insulation for the pair of tubing strings.

Referring now to FIG. 4, a salt dome 100 is penetrated by bore hole 102. Bore hole 102 is equipped with a casing 103 cemented into the bore hole 102 by cement 104. Tubing String 105 is set in casing 103 and extends near the bottom of casing 103. A second tubing string 106 is set in casing 103 and extends substantially beyond the bottom of casing 103. By solution mining or other means, brine cavern 110 is formed in salt dome 100 such that the brine cavern extends beyond the bottom of casing 103 to below the bottom of tubing string 106. Tubing string 105 and tubing string 106 are spaced apart from each other and casing 103 by non-heat conducting spacers 112 which allow the passage of fluid therethrough. Casing 103 is provided with a source 114 of compressed air or inert gas. Tubing string 105 is connected to heat exchanger 115 by pipe 116. Heat exchanger 115 is connected to pump 117 by pipe 118, and pump 117 is connected to tubing string 106 by pipe 119.

In operation, pump 117 pumps hot brine (indicated by a series of the letter H) from the top of brine cavern 110, through tubing string 105, through pipe 116, through heat exchanger 115, through pipe 118, and returns the cool brine (indicated by a series of the letter C) to the bottom of brine cavern 110 through tubing string 106. The casing 103 is pressurized with compressed air or inert gas from source 114 such that the brine interface is near the bottom of casing 103. The pressure from source 114 can be reduced such that the brine in the top of brine cavern 110 would rise in the casing 103, and thus, have the effect of exposing hot brine to the overburden surrounding the casing 103, and thus, have a cooling effect on the hot brine being pumped through the tubing string 105 to the heat exchanger 115.

It should be understood and appreciated that the direction of the flow of the brine could be reversed with hot brine from the bottom of brine cavern 110 being pumped through tubing string 106, through heat exchanger 115, and returned to the top of brine cavern 110 through tubing string 105 which would permit even cooler brine from brine cavern 110 to interface with the compressed air or inert gas from source 114 in the casing 103.

In a typical example, a salt dome with it's top at 3,300 feet below ground surface is penetrated with a bore hole and equipped with a casing and a pair of telescoping tubing strings. A cavern is formed in the salt dome in any suitable manner to contain brine. At the depth of the salt dome, brine in the cavern is at a temperature of 160° F. The inner tubing string extends near the bottom of the brine in the cavern and the casing and outer tubing string extend into the brine near the top of the cavern. The casing and the pair of telescoping tubing strings are open to the brine in the cavern. The inner tubing string is used to produce the brine and is insulated by pressurizing the outer tubing string with air at approximately 1,400 p.s.i. which holds the brine/air interface in the outer tubing string near the top of the salt dome. Upon production, the brine, being 160° F. in the cavern, reaches the surface at approximately the same temperature. By reducing the pressure to 750 p.s.i. the brine/air interface in the outer tubing string is approximately 1,650 feet below the surface and the temperature of the brine reaching the surface is 120° F.

It will be understood that Applicant's invention is illustrated and disclosed with respect to the preferred embodiment being a salt dome with a brine or heat exchange cavern formed therein from which thermal extraction takes place by circulating from the brine cavern either brine or an immiscible heat exchange fluid which is at the temperature of the salt dome, passing the brine or heat transfer fluid through suitable surface equipment to extract heat, and reinjecting the brine or heat transfer fluid into the brine cavern. It will be understood that other mineral sources may be utilized such as a quartzite as discussed in Jacoby II. Furthermore, Applicant's invention is readily adaptable to mineral production, such as salt.

It will be appreciated that the foregoing disclosure is of the preferred embodiments of the invention and many widely different embodiments of the invention may be made without departing from the scope of the invention disclosed herein. Therefore, the scope of the invention is only limited as indicated in the appended claims.

What is claimed is:

1. A method of extracting thermal energy from a geological formation having a soluble mineral deposit comprising:

drilling a bore hole into the mineral deposit to a depth at which a cavern can be formed in the mineral deposit;

equipping the bore hole with a casing extending into said mineral deposit;

setting a pair of tubing strings within said casing, said pair of tubing strings including an insulating tubing string extending to the depth of said casing and a production tubing string within said insulating tubing string extending substantially beyond the casing;

creating a cavern in the mineral deposit by solubilizing the minerals to form a mineral solution;

pressurizing said insulating tubing string with a low thermal conductivity fluid to interface with the minerals solution therein;

circulating the minerals solution from the cavern through said production tubing string to the surface, through a heat exchanger, through the casing and back to said cavern; and adjusting the temperature of said minerals solution circulating through said heat exchanger by varying the pressure of said low thermal conductivity fluid to adjust the interface level between said low thermal conductivity fluid and the mineral solution in said insulating tubing string.

2. The method of claim 1 wherein said mineral deposit is a salt dome, said cavern is a brine cavern, and said mineral solution is brine.

3. The method of claim 2 wherein said low thermal conductivity fluid is air.

4. The method of claim 2 wherein said low thermal conductivity fluid is an inert gas.

5. The method of claim 1 wherein non-heat conducting centralizers maintain said casing, production tubing string and insulating tubing string spaced apart.

6. The method of claim 1 wherein a portion of said mineral solution is withdrawn from said cavern and replaced with an immiscible heat exchange fluid which is circulated from said cavern through the production tubing string, through the heat exchanger and returned to said cavern, and wherein said heat exchange fluid interfaces with said low thermal conductivity fluid in said insulating tubing string.

7. The method of claim 5 wherein non-heat conducting centralizers maintain said casing, production tubing string and insulating tubing string spaced apart.

8. A system for extracting thermal energy from a geological formation having a soluble mineral deposit therein comprising:

a bore hole extending from the surface of the earth into said mineral deposit;

a casing within said bore hole cemented thereto extending into the mineral deposit;

a cavern containing a mineral solution formed in the mineral deposit in communication with and extending below the casing;

a first tubing string within said casing extending to the bottom of said casing in communication with said mineral solution;

a second tubing string extending within said first tubing string to the bottom of said casing and beyond to near the bottom of said cavern;

surface equipment for extraction of thermal energy coupled to said casing;

a pump connecting said surface equipment to said second tubing string for pumping the mineral solution from the bottom of said cavern, through said second tubing string, said surface equipment and back into the cavern through said casing; and a system for adjustably pressurizing said first tubing string with a low thermal conductivity fluid to adjust the level of the interface between the mineral solution and said low thermal conductivity fluid therein.

9. The system of claim 8 wherein said low thermal conductivity fluid is air.

10. The system of claim 8 wherein said low thermal conductivity fluid is an inert gas.

11. The system of claim 8 wherein the said soluble mineral deposit is rock salt and said mineral solution is brine.

12. The system of claim 11 wherein non-heat conducting centralizers surround said first tubing string and said second tubing string for maintaining an annuli between said casing and said first tubing string, and said first tubing string and said second tubing string.

13. The system of claim 8 wherein non-heat conducting centralizers surround the first tubing string and second tubing string for maintaining an annuli between said casing and said first tubing string and said first tubing string and said second tubing string.

14. A method of extracting thermal energy from a geological formation having a soluble mineral deposit comprising:

drilling a bore hole into the mineral deposit to a depth at which a cavern can be formed in the mineral deposit;

equipping the bore hole with a casing extending into said mineral deposit;

setting a pair of tubing strings within said casing, with one of said pair of tubing strings extending to the depth of the casing and the other tubing string extending substantially beyond the casing;

forming a cavern in the mineral deposit by solubilizing the mineral to form a mineral solution;

pressurizing said casing with a low thermal conductivity fluid to interface with the mineral solution therein;

circulating the mineral solution from the cavern through one of said pair of tubing strings to the earth's surface, through a heat exchanger, through the other of said pair of tubing strings and back to said cavern; and adjusting the temperature of said mineral solution circulating through said heat exchanger by varying the pressure of said low thermal conductivity fluid to adjust the interface between said low thermal conductivity fluid and the mineral solution in said casing.

15. The method of claim 14 wherein said mineral deposit is a salt dome and said mineral solution is brine.

16. The method of claim 15 wherein said low thermal conductivity fluid is air.

17. The method of claim 14 wherein a portion of the mineral solution is replace by a heat exchange fluid which is circulated instead of the mineral solution, and wherein said heat exchange fluid interfaces with the low thermal conductivity fluid.

18. The method of claim 14 wherein said pair of tubing strings are maintained spaced apart from each other and said casing.

19. The method of claim 15 wherein a portion of the brine is replace by a heat exchange fluid which is circulated instead of the brine, and wherein said heat exchange fluid interfaces with the low thermal conductivity fluid.

20. The method of claim 19 wherein said pair of tubing strings are maintained space apart from each other and said casing.

* * * * *